US011531785B2

(12) United States Patent
Hely et al.

(10) Patent No.: US 11,531,785 B2
(45) Date of Patent: Dec. 20, 2022

(54) PUF-BASED DATA INTEGRITY

(71) Applicant: Arizona Board of Regents on Behalf of Northern Arizona University, Flagstaff, AZ (US)

(72) Inventors: David Hely, Grenoble (FR); Paul G Flikkema, Flagstaff, AZ (US); Bertrand F Cambou, Flagstaff, AZ (US)

(73) Assignees: ARIZONA BOARD OF REGENTS ON BEHALF OF NORTHERN ARIZONA UNIVERSITY, Flagstaff, AZ (US); INSTITUT POLYTECHNIQUE DE GRENOBLE; UNIVERSITÉ GRENOBLE ALPES

( * ) Notice: Subject to any disclaimer, the term of this patent is extended or adjusted under 35 U.S.C. 154(b) by 0 days.

(21) Appl. No.: 17/018,493

(22) Filed: Sep. 11, 2020

(65) Prior Publication Data
US 2021/0081569 A1 Mar. 18, 2021

Related U.S. Application Data

(60) Provisional application No. 62/899,982, filed on Sep. 13, 2019.

(51) Int. Cl.
*G06F 21/64* (2013.01)
*G06F 12/14* (2006.01)
(Continued)

(52) U.S. Cl.
CPC .............. *G06F 21/64* (2013.01); *G06F 12/14* (2013.01); *G06F 21/79* (2013.01); *H04L 9/3278* (2013.01); *G06F 2212/1052* (2013.01)

(58) Field of Classification Search
CPC .......... G06F 21/64; G06F 12/14; G06F 21/79; G06F 2212/1052; H04L 9/3278
See application file for complete search history.

(56) References Cited

U.S. PATENT DOCUMENTS 7,428,694 B2   9/2008   Pistoulet
7,581,089 B1   8/2009   White
(Continued)

OTHER PUBLICATIONS

G. E. Suh, C. W. O'Donnell and S. Devadas, "Aegis: A Single-Chip Secure Processor," in IEEE Design & Test of Computers, vol. 24, No. 6, pp. 570-580, Nov.-Dec. 2007.*
(Continued)

*Primary Examiner* — Matthew T Henning
(74) *Attorney, Agent, or Firm* — Quarles & Brady LLP

(57) ABSTRACT

A system includes a memory device configured to store data at addressable locations in the memory device, a physically unclonable function (PUF) device including an array of PUF elements, and a memory interface coupled to the memory device and the PUF device. The memory interface is configured to receive a request to store first data in the memory device, store the first data in the memory device at a first location of the memory device, and transmit the first data and the first location to the PUF device. The PUF device is configured to create a first challenge value using the first data and the first location, generate a first response value using the first challenge value, and store the first response value as a first data integrity tag in the memory device, wherein the first data integrity tag is associated with the first data.

20 Claims, 11 Drawing Sheets

(51) Int. Cl.
*G06F 21/79* (2013.01)
*H04L 9/32* (2006.01)

(56) References Cited

U.S. PATENT DOCUMENTS

| | | | |
|---|---|---|---|
| 7,747,935 | B2 | 6/2010 | Bancel et al. |
| 7,768,318 | B2 | 8/2010 | Bancel et al. |
| 2009/0271454 | A1* | 10/2009 | Anglin ................ G06F 16/2365 |
| 2017/0344438 | A1 | 11/2017 | Bilgiday et al. |
| 2018/0358310 | A1 | 12/2018 | May et al. |
| 2019/0385489 | A1* | 12/2019 | Norrman .................. G09C 1/00 |
| 2022/0166638 | A1* | 5/2022 | Razi ...................... H04L 9/0866 |

OTHER PUBLICATIONS

Miao, J. et al., "SD-PUF: Spliced Digital Physical Unclonable Function," IEEE Transactions on Computer-Aided Design of Integrated Circuits and Systems,37(5), pp. 927-940, 2017.

Hu, H. et al., "Data-oriented programming: On the Expressiveness of Non-contral Data Attacks." Security and Privacy (SP), 2016 IEEE Symposium on. IEEE, pp. 969-986, 2016.

Jeon D. et al., "Circuit Design of Physical Unclonable Function for Security Applications in Standard CMOS Technology", IEEE International Conference on Electron Devices and Solid-State Circuits, 2016.

Song, C. et al., "HDFI: Hardware-Assisted Data-Flow Isolation." 2016 IEEE Symposium on Security and Privacy (SP), 2016.

Dang, T. H. et al., "The Performance Cost of Shadow Stacks and Stack Canaries." Proceedings of the 10th ACM Symposium on Information, Computer and Communications Security, pp. 555-566, 2015.

Bar-El, H. et al., "The Sorcerer's Apprentice Guide to Fault Attacks," in Proceedings of the IEEE, vol. 94, No. 2, pp. 370-382, 2006.

Ozdoganoglu, H. et al., "SmashGuard: A Hardware Solution to Prevent Security Attacks on the Function Return Address," in IEEE Transactions on Computers, vol. 55, No. 10, pp. 1271-1285, 2006.

One, A. "Smashing the Stack for Fun and Profit", Phrack Magazine, vol. 49/14 1996, http://phrack.org/issues/49/14.html.

* cited by examiner

PUF-BASED DATA INTEGRITY

CROSS-REFERENCE TO RELATED APPLICATIONS

The present application claims priority to U.S. Provisional Application 62/899,982 entitled "PHYSICAL UNCLONABLE FUNCTION-BASED ON-CHIP DATA INTEGRITY" and filed on Sep. 13, 2019, the disclosure of which is incorporated herein by reference.

BACKGROUND OF THE INVENTION

Corruption of data stored in a memory element of a computer system can be leveraged by hackers to hijack software execution or to leak sensitive information or otherwise disrupt proper operation of the computer system. Accordingly, natural errors in such memory elements, whether due to software bugs or harsh environments, can also lead to on-chip data corruption, which may as a result induce improper operation of applications that rely on the on-chip data. In computer systems, data corruption may be introduced into system memory by software, where malicious or buggy code accesses the memory and overwrites data, or by hardware malfunction, where a natural or malicious perturbation induces faulty hardware behavior resulting in a modification of data stored in a memory element.

BRIEF SUMMARY

In an embodiment, a system includes a memory device configured to store data at addressable locations in the memory device, a physically unclonable function (PUF) device including an array of PUF elements, and a memory interface coupled to the memory device and the PUF device. The memory interface is configured to receive a request to store first data in the memory device, store the first data in the memory device at a first location of the memory device, and transmit the first data and the first location to the PUF device. The PUF device is configured to create a first challenge value using the first data and the first location, generate a first response value using the first challenge value, and store the first response value as a first data integrity tag in the memory device, wherein the first data integrity tag is associated with the first data.

In another embodiment, a system includes a first register configured to store data at addressable locations in the first register, a second register configured to store data at addressable locations in the second register, and a physically unclonable function (PUF) device including an array of PUF elements. The PUF device is configured to store data in the second register and retrieve data from the second register. The PUF device cannot access the first register. The system includes a memory interface coupled to the first register and the PUF device. The memory interface is configured to store data in the first register and retrieve data from the first register. The memory interface cannot access the second register. The memory interface is configured to store first data in the first register at a first location of the first register, and transmit the first data and the first location to the PUF device. The PUF device is configured to create a first challenge value using the first data and the first location, generate a first response value using the first challenge value, and store the first response value as a first data integrity tag in the second register, wherein the first data integrity tag is associated with the first data.

In another embodiment, a method includes receiving a request to store first data in a memory device. The memory device is configured to store data at addressable locations in the memory device. The method includes storing the first data in the memory device at a first location of the memory device, creating a first challenge value using the first data and the first location, transmitting the first challenge to a PUF device to generate a first response value using the first challenge value, and storing the first response value as a first data integrity tag in the memory device, wherein the first data integrity tag is associated with the first data.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource. References to "one-way functions" refer mathematical operations which are easy or practical to compute but whose inputs are difficult or impractical to recover using a known output of the function given the computational resources available. References to "approximately" or "effectively" one-way functions refer to functions that may be easily inverted if additional "secret" information is known but which are one-way to a party that does not have access any such secret information.

Data stored in the memory of computing system may become corrupted for a number of different reasons. In some cases, data stored in memory may be corrupted by an attacker to hijack software execution or to leak sensitive information. In other cases, natural errors in data stored in system memory, due to either software bugs or harsh environments, can also lead to on-chip data corruption, which may result in improper system operations or faults occurring in system applications.

Figure 1:
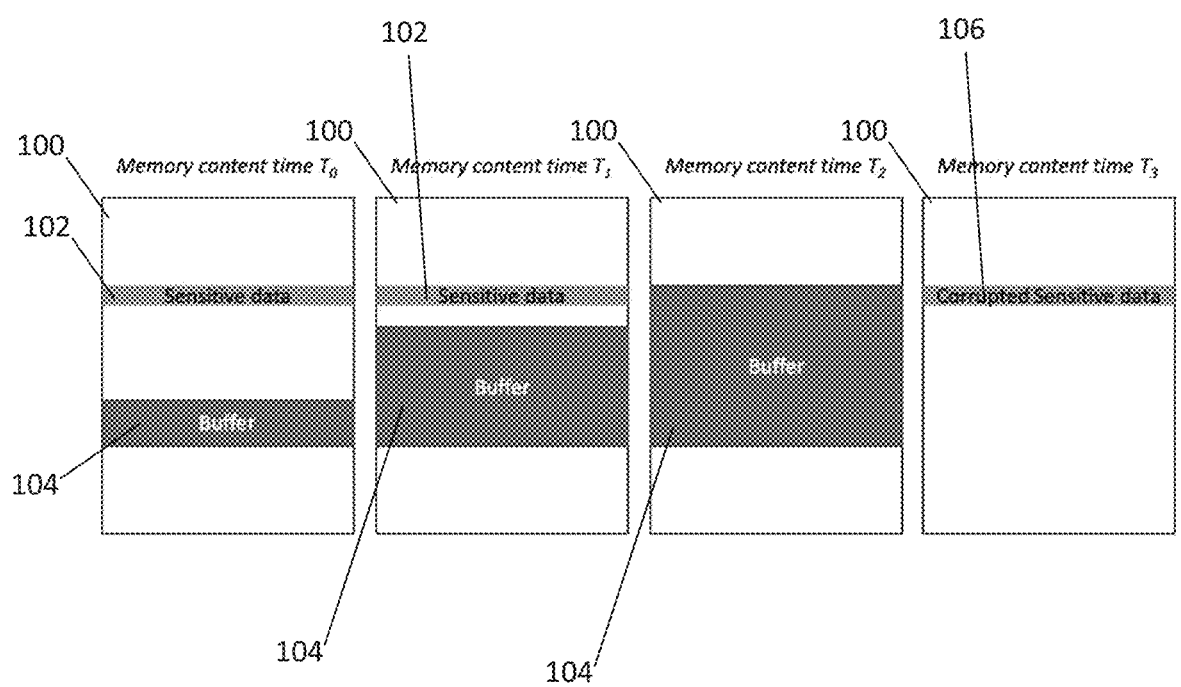
FIG. 1 depicts the state of a computer memory at different times T while the computer system containing the memory executes an application.

In some situations, the contents of computer system memory can be corrupted to modify the return address of a function executed by an application running on the computer system. By manipulating the return address, and attacker can cause the software application to execute code provided by the attacker. This can enable the attacker to cause the computer system to execute arbitrary code, thereby giving control (or at least partial control) of the computer system to the attacker. In some embedded computer systems the system's working memory can store application-critical values and decision-sensitive variables. Attackers may therefore leverage software bugs or weaknesses to maliciously modify sensitive data in memory. An example of this type of attack is illustrated in FIG. 1. FIG. 1 depicts the state of a computer memory 100 at different times T while the computer system containing the memory executes an application.

At time $T_0$, the application stores in memory a data item 102 in a particular address of the memory. In the same time, a dynamic buffer 104 is allocated to store dynamic data in a memory address relatively close to the data item 102. This buffer 104 can be used to store data entered by a user. If the data buffer 104 is not correctly controlled, a user can cause the buffer 104 to grow as seen at time $T_1$. As the buffer 104 grows, the buffer's content will eventual overwrite the portion of memory 100 storing data item 102. Accordingly, as illustrated in FIG. 1, at time $T_2$, the data item 102 has been replaced by data related to the buffer 104. In this manner an attacker (who causes buffer 104 to grow in size as depicted in FIG. 1 and controls the contents of buffer 104) can replace the data item 102 with alternative data values controlled by the attacker. Accordingly, an attacker that can gain control of the data that is entered into buffer 104 can then modify the data item 102 with an attacker-determined value. When an application later accesses the memory (e.g., at time $T_3$ in FIG. 1A) in an attempt to read the data item 102 that was originally stored at that location, the application will instead read the data value that was entered at that location by the attacker. The attacker using this means may be able to gain control over the application.

Figures 2A, 2B:
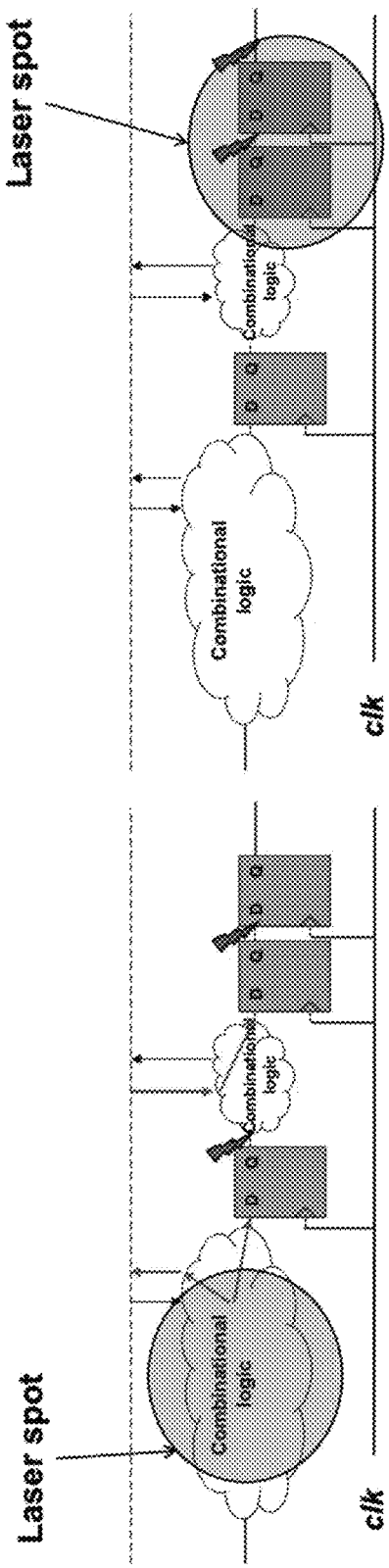
FIGS. 2A and 2B depict a laser fault attack on combinational logic (FIG. 2A) and direct laser fault attack in sequential logic (FIG. 2B) of a computer system.

In another attack on a computer system, an attacker simply attempts to disrupt an operation of a computer system by modifying data stored in a memory of the computer system. Such so-called fault-injection attacks aim to disturb the integrated circuit of the computer by various means such power glitches, clock glitches, or laser illumination, among others. To illustrate, FIGS. 2A and 2B depicts example mechanisms involved in a laser-based attack against register elements in an integrated circuit of a computer system. A computer system's registers are formed by combinational logic (to compute the data to be latched or stored) and sequential elements (i.e., flip-flops that store the data). A perturbation can either occur in the combinational logic circuits (as depicted in FIG. 2A) or in the sequential logic circuits (as depicted in FIG. 2B) by exposing such circuits to relatively high-power laser light. In both cases such perturbations result in modifications of the original data that was originally processed and stored by the depicted circuits. Such attacks can also be performed against many types of volatile and non-volatile memories to cause a software application to crash or otherwise operate improperly.

To protect against an attacker modifying values stored in memory of a computer system (or modifications to such stored values by natural phenomenon), several hardware-based mitigation techniques have been proposed such as data redundancy, shadow stack, and safeguarding.

Data redundancy mitigation approaches are design to duplicate data to be protected across multiple storage locations or memory systems. Using such approaches, when data is stored in memory, the data is duplicated and stored in different locations within a memory system or in different locations in different memory systems. When an application requests the data, the computer system retrieves the data from the multiple locations (and memory systems) in which the data was originally stored. At that time, the computer system determines whether discrepancies exist between the retrieved original and the duplicated data. Such discrepancies, if detected, can indicate that the data in one or the other memory location has been modified or otherwise corrupted.

Although this mitigation approach can detect data modifications in some circumstances, if an attacker is able to generate the same data modification or error in both the original data and the duplicated data (i.e., the data that was stored at alternative memory locations or in alternate memory system), the protection scheme may not detect such changes or errors.

An alternative to data duplication is code redundancy, where an error-detecting or error-correcting code such as parity codes are computed based on the data to be protected. When the data is retrieved, the parity code is computed again using the data that was retrieved from memory. The original parity code and the newly calculated parity code are then compared. If the data has been modified, the stored parity code and newly computed parity code will be different. However, if the parity code scheme is known (as details of parity code approaches are often published), it is possible for an attacker to modify the code that was created and stored when the data was original stored into memory. This can enable an attacker to modify the stored original parity code, ensuring that the parity codes match when the attacker's modified data is read from the memory system. This could defeat a code redundancy data protection scheme.

In some implementations of data redundancy schemes, data that is being stored is duplicated across a conventional memory system and a separate memory system that is protected from access by a system processor. When an application executed by the processor stores data, the data is stored in a conventional manner in the first memory system and is separately duplicated in the separate memory system (e.g., a shadow stack) that is not accessible to the processor. Consequently, the data stored in the separate memory system cannot be corrupted by the processor or an attacker that is interacting with an application being executed by the processor. As a result, the data stored in the separate memory system may not be corrupted with software or application attacks. Although effective in many cases, this mitigation approach can be costly as it requires the creation and management of a dedicated memory which induces additional cost and design constraints.

Finally, a data protection scheme may involve storing pre-defined non-functional data values in memory along with an application's data. These non-functional data values, called canaries, are then periodically checked. If any of the values do not correspond to their originally-defined values, that indicates the memory has been altered and other values used by the application may also have been altered.

Although effective in some circumstances, these approaches all run the risk that one can predict how the data integrity checks are performed in order to successfully propagate errors within both the originally-stored data and any checking values (whether duplicated stored data, parity codes, or canary values). Moreover, once a breach of a data integrity scheme has been identified on one machine, the attack can be replicated on other devices using the same or similar data integrity schemes.

The data integrity scheme described herein is arranged to provide redundant data that may not be predicted by the attacker, thereby inhibiting attacks on the redundant data. Moreover, the redundant data is generated in such a way that it is different from computer system to computer system. As a result, even if an attacker finds a way to corrupt data for a given computer system, the attack may not be effective on another computer system. In the present data integrity scheme, a tamper-proof tag is created and stored in a memory system in addition to the data being protected. The tamper-proof tag is generally different depicting upon the circuitry that generated the tag and the data being stored and so can be considered unique to the contents of the data and the circuitry that generated the tamper-proof tag. To protect a data item within a memory, when the processor stores the data, the data is stored in conjunction with the data's associated tag. When the data is read back from the memory, a system process also reads the associated tag and determines whether the tag corresponds to the data. If not, the processor can determine that the data has been altered or modified.

To be efficient, this "tamper-proof" data integrity tag can be 1) unique for a given data item being stored; and 2) unpredictable by an attacker. As part of generating the data integrity tag, the present system a hardware primitive such as a physically unclonable function (PUF) to generate the data integrity tag. Digital PUFs are good candidates for this application since they are inherently robust.

PUF devices or PUF arrays are hardware primitives, which rely on intrinsic manufacturing variations introduced during device fabrication to produce an array of circuit elements with one or more characteristics that are unique, unpredictable, and unclonable. A PUF measures a chosen physical parameter to extract a unique chip signature. A logical circuit receives a digital challenge and returns a response back depending on both the challenge and the physical function. Each PUF array is characterized by challenge response pairs (CRP) which may be stored in a database, representing measured characteristics of devices identified by the challenges. A PUF array can be used to provide on chip authentication data or keys which are unique to each device.

In the context of this disclosure, a processing instruction is any information used to cause a control circuitry coupled to a PUF device to produce an expected response (sometimes referred to as a "challenge response") corresponding to that information by measuring values from the one or more PUFs making up the PUF device. Along these lines, a processing instruction may be input to a PUF device that is used to produce a response having one or more expected values which depend upon characteristics of the PUFs belonging to the PUF device to which the processing instruction is issued. The appropriate values may be derived from those characteristics using instructions stored by the PUF device or other processing circuitry, received by the PUF device or other processing circuitry and/or additional information supplied to the PUF device or other processing circuitry (such as a password of a user). In one simple non-limiting example, a processing instruction might simply cause a PUF device to return the values stored by PUFs of a PUF array at a specified address or range of addresses. In other non-limiting examples, a processing instruction might include instructions to perform a mathematical, logical, or other operation(s) on those values.

In general, the values outputted by each PUF of the PUF device are the "fingerprints" of microelectronic components such as memory devices. Assuming that the PUF is reliable, the same reading can be extracted on demand. Error matching and correcting methods can take care of the potential mismatches when the PUF is subject to aging, temperature changes, or environmental variations.

Non-limiting examples of measurable physical characteristics of devices used in PUF devices are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., '0' or '1') after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the '0' or '1' state could be used as a characteristic of that device. Other non-limiting examples of suitable characteristics include optical measurements. For instance, a PUF device may be an optical PUF device that, when illuminated by a light source such as a laser, produces a unique image. This image may be digitized and the pixels may be used as an addressable PUF array. A PUF should be predictable, and subsequent responses to the same processing instruction should be similar to each other (and preferably identical).

Additional non-limiting examples of measurable physical characteristics of devices used in PUF arrays are currents induced by an applied input voltage or current, voltages of various circuit elements during operation of a PUF device in response to an input or other stimulus. Further non-limiting examples may include derived quantities such as resistance, conductance, capacitance, inductance, and so on. In certain embodiments, such characteristics of a device may be functions of an input or stimulus level of the device. For example, a current-voltage characteristics of memristors and other devices may be non-linear. Thus, the measured resistance of a memristor will depend on a current or voltage level applied during the measurement process. If a memristor or device with similar characteristics is operated within a non-hysteretic regime, the measured resistance may be a predictable function of the input stimulus (e.g., an input current supplied by a current source). Thus the relationship between applied current and voltage measured across a memristor (or between applied voltage and current measured through the memristor) is one example of a non-linear transfer function which can be exploited to produce multiple discrete or continuous characteristic values using a single PUF device.

The present data integrity scheme may be utilized within a computer system that includes a processor for executing instructions, a memory system, a memory manager (e.g., a memory interface) for implementing the storage and retrieval of data from the memory system (though in some devices the memory manager may be incorporated into the processor), and a PUF device (e.g., a PUF array or equivalent device) in communication with the processor and/or memory manager. The system may be implemented within end user computer systems, such as laptops or desktop computer, mobile devices, telephones, smart televisions, and the like. Or, the computer system may be implemented as a special-purpose data management chip or integrated circuit arranged for incorporation into larger systems, products, and devices. It should be understood that the present data integrity schemes may be utilized, generally, in any devices configured to process, store, and retrieve data.

Figure 3A:
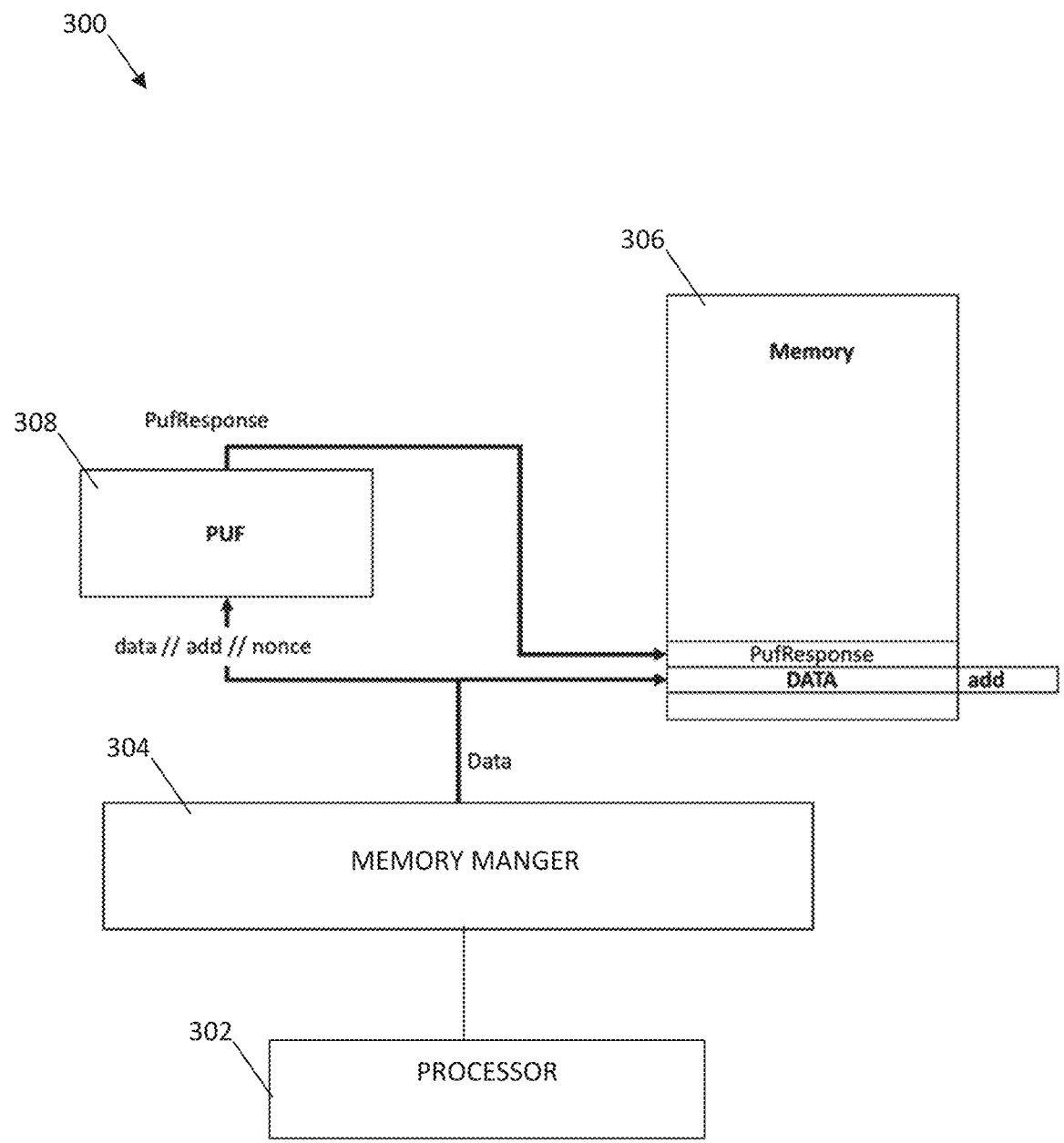
FIG. 3A is a block diagram depicting functional components of a computer system configured to store data in accordance with the present data integrity scheme.

In one implementation, a computer system configured in accordance with the present data integrity scheme is configured to store data. To illustrate, FIG. 3A is a block diagram depicting functional components of a computer system 300 configured to store data in accordance with the present data integrity scheme. System 300 may be implemented as part of a conventional computing system (e.g., as part of a laptop or desktop computer) or an application-specific device (e.g., implemented as part of a single integrated circuit or discrete set of components) manufactured for incorporation into larger computer systems.

Computer system 300 includes processor 302 configured to execute instructions and interact with other components of system 300. Processor 302 may run applications, gather data (e.g., from user interfaces, memory systems, network interfaces, or the like) and perform functions and run code to interact with and manipulate the data to generate output data. To store that output data, processor 302 interacts with a memory interface 304, which is configured to facilitate the storage of data into memory device 306 or retrieval of data therefrom. Memory interface 304 may be implemented as a sub-component of processor 302 or, alternatively and as shown in FIG. 3A, memory interface 304 may be a separate system component.

Memory device 306 is configured to store data received from memory interface 304. Data stored by memory device 306 is stored at a particular address within memory device 306 enabling that data to be later retrieved from memory device 306 by accessing the same location in memory device 306 and reading the data stored therein.

System 300 includes PUF device 308. PUF device 308 is configured to generate an output data (i.e., a "response" value) in response to an input (i.e., a "challenge" value). PUF device 308 includes an array of PUFs. As such, the challenge issued to the PUF may identify a number of different addresses that identify different PUFs within PUF device 308 that are to be tested or measured to generate the PUF device 308's response.

Figure 3B:
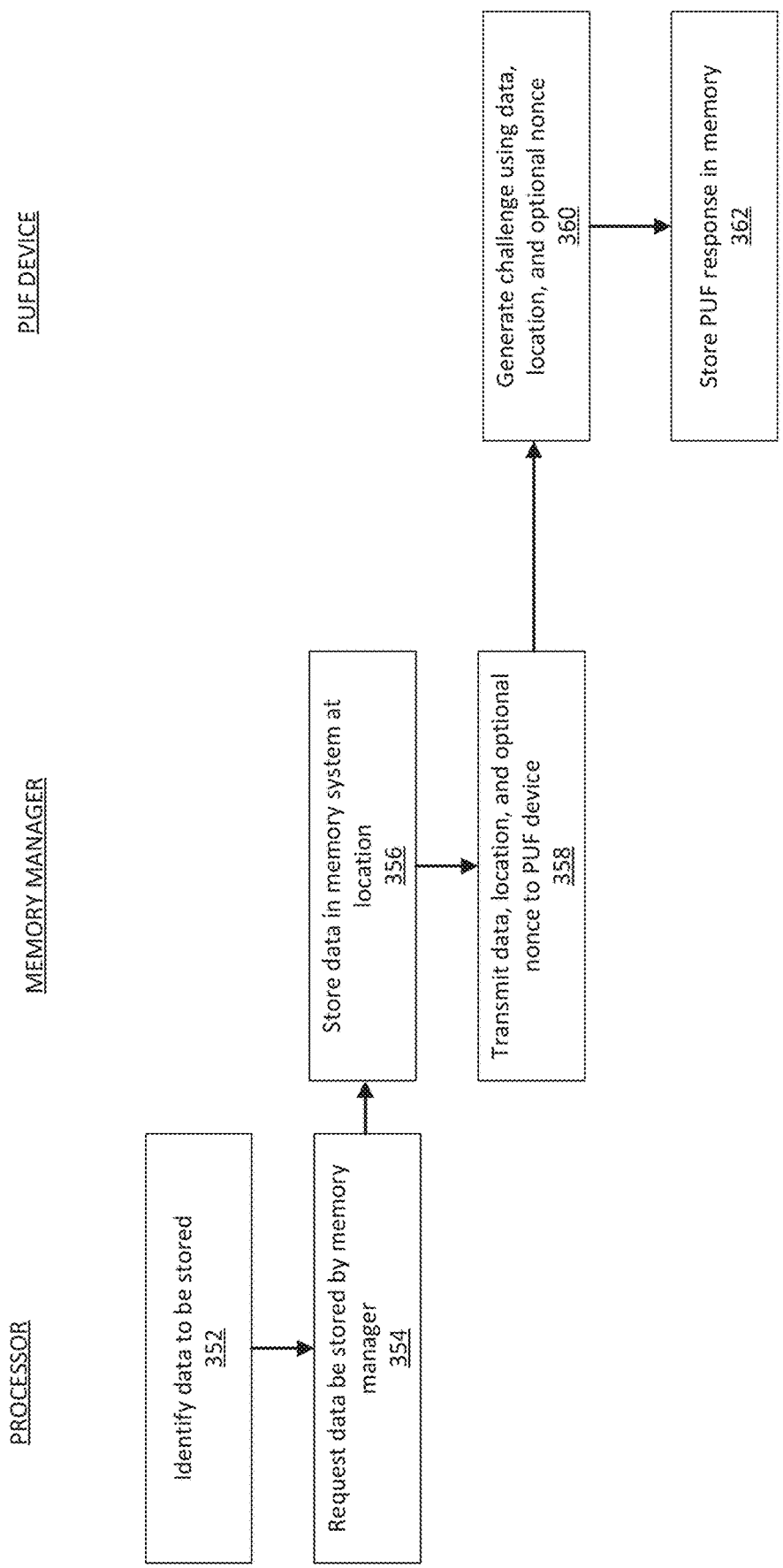
FIG. 3B is a flowchart depicting an example method for storing data using the present data integrity scheme and the system depicted in FIG. 3A.

FIG. 3B is a flowchart depicting an example method for storing data using the present data integrity scheme and the system depicted in FIG. 3A. In step 352, processor 302 identifies (or generates) data to be stored by system 300. In step 354, the processor 302 requests that memory interface 304 store the data.

In step 356, memory interface 304 stores the data in a known location of memory device 306. After the data has been stored at a particular location in memory device 306, memory interface 304, in step 358, transmits a copy of the data, the location, and, optionally, a nonce value to PUF device 308. The nonce value may be a randomized value that is generated at power turn on of system 300. A different nonce may be generated at each power-on event and the nonce value may stay static for the period of time the system continues to be powered-up. By changing the nonce at each power on event, even if an attacker is able to access or manipulate the value of the data integrity tag generated by system 300 (and described below), those values may not be used to manipulate data in a different computer system or even in the same system following a power cycle.

In step 360, PUF device 308 converts the data, location, and nonce values in a challenge that can be used by PUF device 308 to generate a response value. Any suitable algorithm may be utilized to generate the challenge. For example, the data, location, and nonce values may be concatenated into a string. The string may then be used as the challenge. Alternatively, the string can be hashed using a function that generates a fixed-length output based on input data. The fixed-length output of the hashing function can then be translated into an address within the array of PUF elements in the PUF device. In some embodiments, PUF device 308 may be configured to execute additional instructions to use the output of the hashing functions to generate an address or sequence of addresses of PUF elements. For example, the instructions executed by the PUF device 308 may cause the PUF device 308 to process the output of the hashing function into a sequence of addresses, where the sequence is determined by the instructions (e.g., starting with an address determined by the output of the hashing function select a number of additional addresses, where the additional addresses are only odd numbered addresses). In some cases, the set of instructions implemented by the PUF device to determine the set of addresses may be selected based upon the output value of the hashing function. For example, the last digit in the output value may be used to identify a particular algorithm the PUF device uses to generate a set of addresses.

Once generated by the PUF device based on the challenge, the PUF response (which is used herein as a data integrity tag) is stored in memory device 306 in step 362. In embodiments, memory device 306 associates the stored data integrity tag with the location in which the data was original stored (i.e., in step 356) (e.g., by appending the location to the stored PUF response). In this arrangement, the data integrity tag stored in memory 306 can serve as a tamper-proof data integrity tag usable in a data integrity scheme to ensure the integrity of the data that was stored in step 356.

Figure 4A:
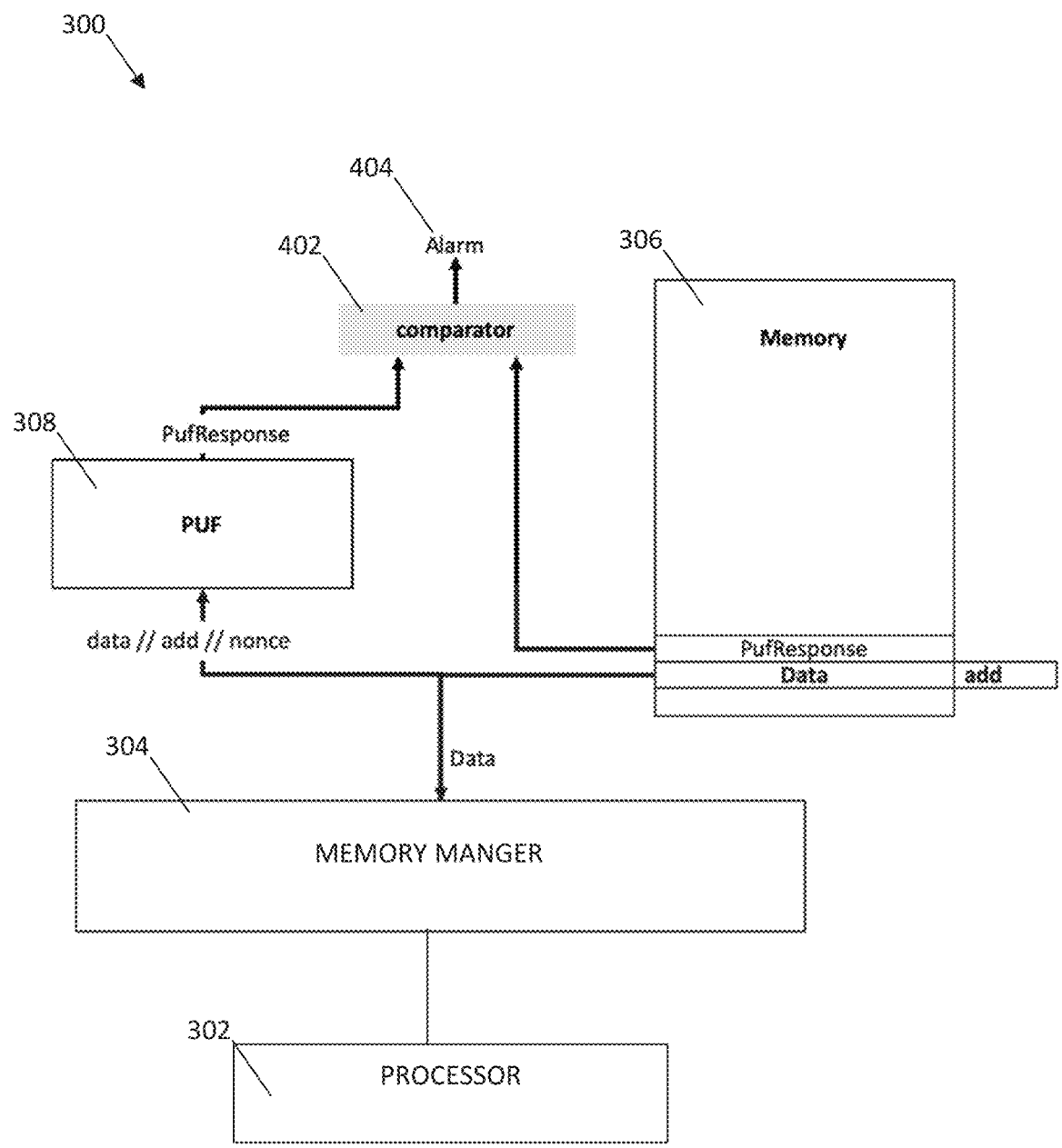
FIG. 4A depicts the system of FIG. 3A arranged to perform a data read function.
Figure 4B:
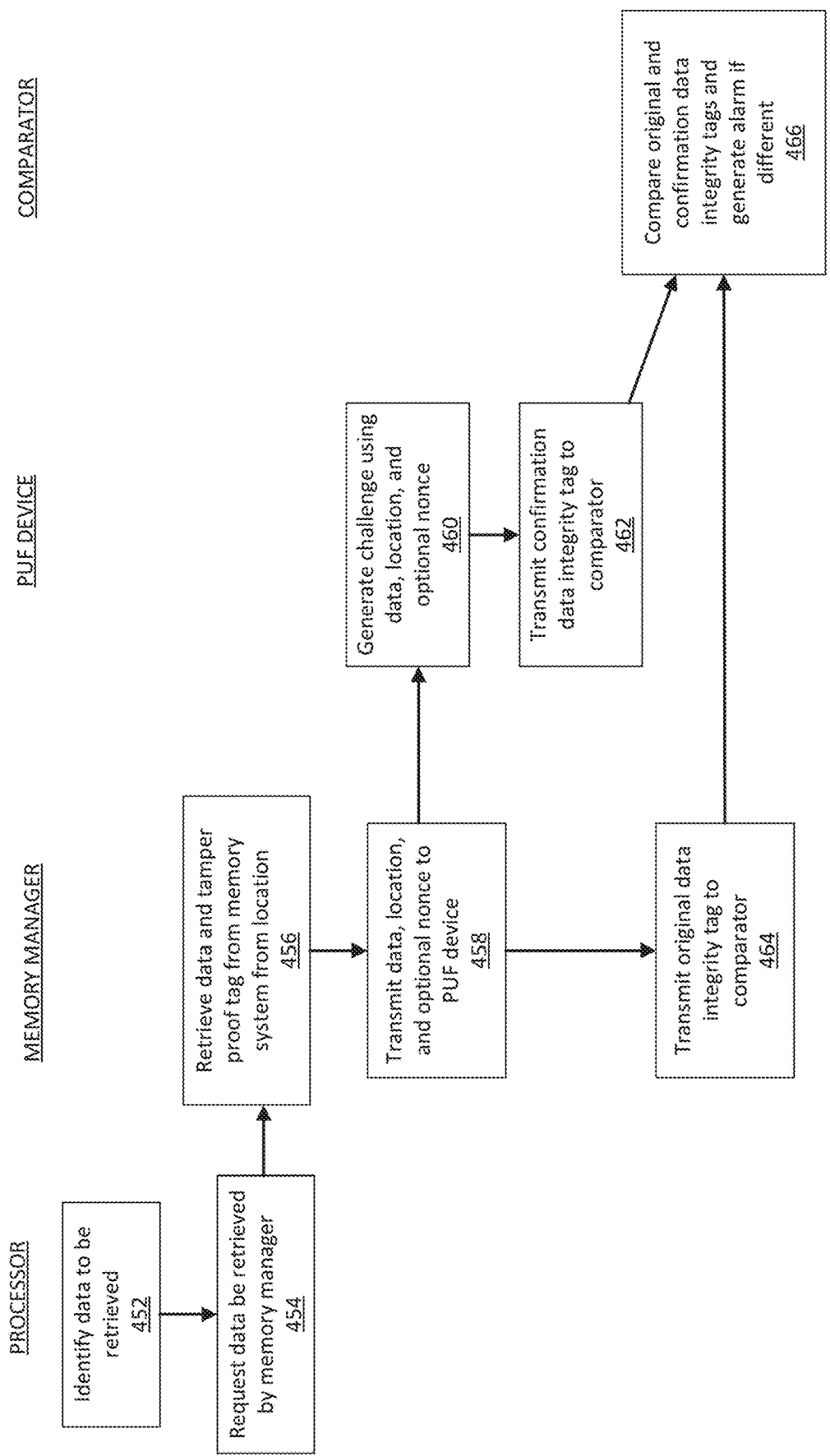
FIG. 4B is a flowchart depicting an example method for retrieving data using the present data integrity scheme and the system depicted in FIG. 4A.

When the data is to be retrieved from memory device 306, system 300 is configured to implement a data retrieval function. To illustrate, FIG. 4A depicts the system 300 of FIG. 3A arranged to perform a data read function. FIG. 4B is a flowchart depicting an example method for retrieving data using the present data integrity scheme and the system depicted in FIG. 4A.

As illustrated in FIG. 4A, for data reading functions, system 300 includes a comparator 402 configured to compare data integrity tags received from PUF device 308 and from memory 306. If the tags, as described below, do not match, comparator 402 is configured to output or generate an output alarm 404. The alarm may be used to interrupt the operation of an application running in conjunction with system 300, alert an operator of system 300 (e.g., via an alert displayed on a display screen, or otherwise communicated to the operator), or modify an operation of system 300 (e.g., by disabling particular network connectivity functions, performing a system reset, or the like).

In step 452, processor 302 identifies data to be retrieved from memory 306. In step 454, the processor 302 requests that memory interface 304 retrieve the data from a known location of memory device 306. Memory interface 304, in step 456, retrieves the data (to generate retrieved data) and any associated data integrity tag (referred to as the original data integrity tag) that is stored in memory device 306 (e.g., data integrity tag stored in step 362 of FIG. 3B).

After the data has been retrieved from the location in memory device 306, memory interface 304, in step 458, transmits a copy of the retrieved data, the location, and, optionally, a nonce value to PUF device 308. The nonce value may be a randomized value that is generated at power turn on of system 300. A different nonce may be generated at each power-on event and the nonce value may stay static for the period of time the system continues to be powered-up.

In step 460, PUF device 308 converts the data, location, and nonce values in a challenge that can be used by PUF device 308 to generate a response value. Any suitable algorithm may be utilized to generate the challenge. For example, the data, location, and nonce values may be concatenated into a string. The string may then be used as the challenge. Alternatively, the string can be hashed using a function that generates a fixed-length output based on input data. The fixed-length output of the hashing function can then be translated into an address within the array of PUF elements in the PUF device. In some embodiments, PUF device 308 may be configured to execute additional instructions to use the output of the hashing functions to determine an address or sequence of addresses of PUF elements. For example, the instructions executed by the PUF device 308 may cause the PUF device 308 to process the output of the hashing function into a sequence of addresses, where the sequence is determined by the instructions (e.g., starting with an address determined by the output of the hashing function select a number of additional addresses, where the additional addresses are only odd numbered addresses). In some cases, the set of instructions implemented by the PUF device to determine the set of addresses may be selected based upon the output value of the hashing function. For example, the last digit in the output value may be used to identify a particular algorithm the PUF device uses to generate a set of addresses.

Once generated, the PUF response to the challenge generated in step 460 (which is used herein as a confirmation data integrity tag) is transmitted to comparator 402 in step 462. At or about the same time, in step 464, memory interface 304 causes register 506 to retrieve the original data integrity tag (i.e., the tag stored in step 362, FIG. 3B) to comparator 402. In step 466, comparator 402 compares the original data integrity tag to the confirmation data integrity tag. If the values are the same or equal, the data retrieved from register 506 in step 456 is identical to or equal to the data that was originally stored in register 506 in step 356 of FIG. 3A. If, however, the original data integrity tag is different from the confirmation data integrity tag, comparator 402 outputs an alarm signal providing notification of the discrepancy and indicating that the data retrieved from register 506 may have been altered from when the data was originally stored.

The present data integrity scheme may be used in conjunction with memory systems that include on-chip data registers such as data registers in a processor, critical registers such as the instruction register, or peripheral registers (such as crypto core registers). In such implementations, data may be stored in a register accessible by the processor. A shadow register that may not be accessible to the processor may be used to store the tamper-proof data integrity tags generated by a PUF device. When data is written to the register that is accessible to the processor, a corresponding data integrity tag is generated by the PUF device and stored in the shadow register that is not accessible by the processor. When the data is read from the first register, the PUF device generates a confirmation data integrity tag for the retrieved data that is compared to the original data integrity tag. If the two data integrity tags are not the same or equal, that is an indication that the retrieved data may have been modified.

Figure 5A:
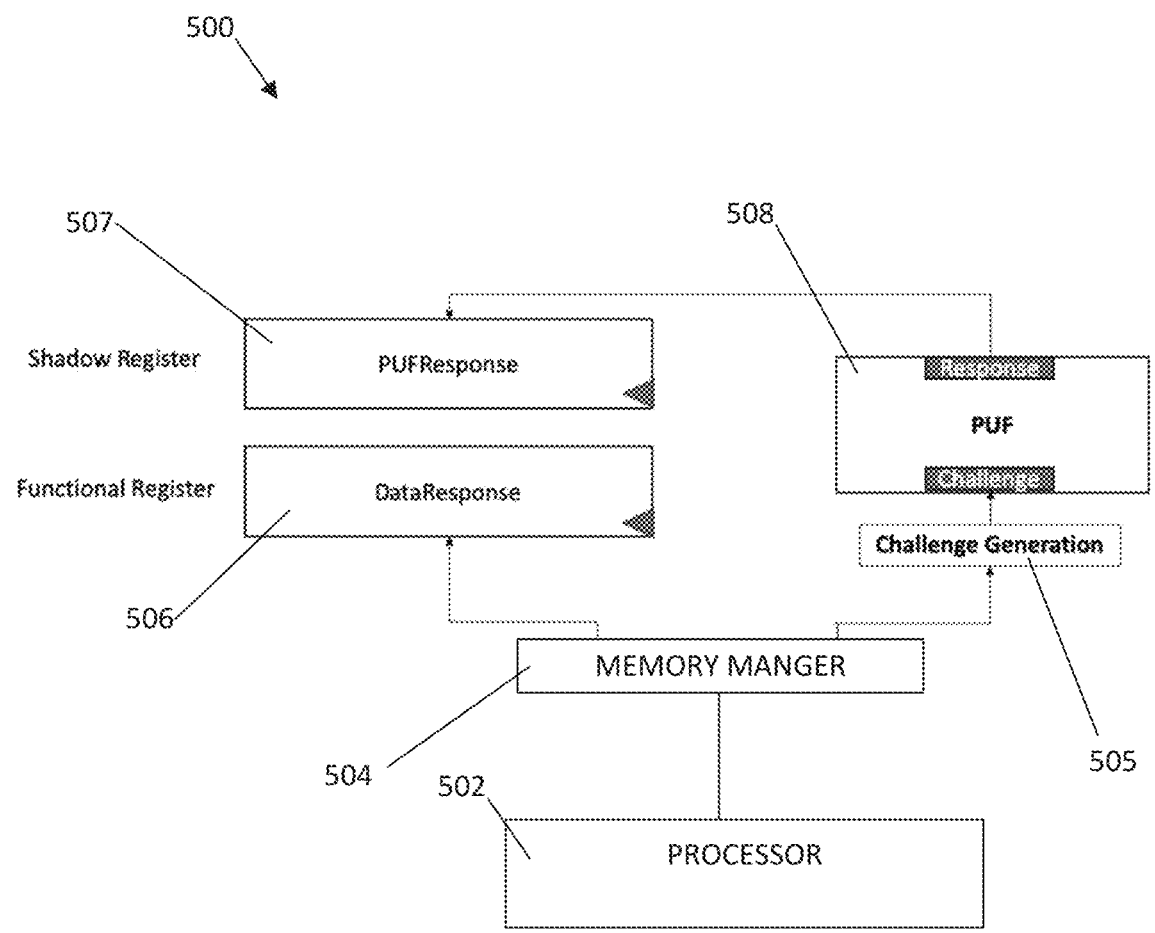
FIG. 5A is a block diagram depicting functional components of an on-chip computer system configured to store data in a register in accordance with the present data integrity scheme.

FIG. 5A is a block diagram depicting functional components of a computer system 500 configured to store data in accordance with the present data integrity scheme. System 500 may be implemented as an on-chip system configured to manage the storing, retrieval, and confirmation of data stored in or retrieved from a number of on-chip register. System 500 may be implemented as part of a conventional computing system (e.g., as part of a laptop or desktop computer) or an application-specific device (e.g., implemented as part of a single integrated circuit or discrete set of components) manufactured for incorporation into larger computer systems.

System 500 includes processor 502 configured to execute instructions and interact with other components of system 500. Processor 502 may gather data (e.g., from user interfaces, memory systems, network interfaces, or the like) and perform functions and run code to interact with and manipulate the data to generate output data. To store that output data, processor 502 interacts with a memory interface 504, which is configured to facilitate the storage of data into register 506 or retrieval of data therefrom. Memory interface 504 may be implemented as a sub-component of processor 502 or, alternatively and as shown in FIG. 5A, memory interface 504 may be a separate system component. In the on-chip implementation depicted in FIG. 5A, processor 502 may be provided as part of the on-chip solution. Or, alternatively, processor 502 may not be part of the on-chip solution and may instead be located in a separate part of a larger computer system, where the processor is configured to communicate with memory interface 504. Accordingly, processor 502 is not necessarily part of the on-chip solution depicted in FIG. 5A.

Memory interface 504 is configured to interact with register 506 to store data into register 506 and retrieve data therefrom. Data stored by register 506 is stored at a particular address within register 506 enabling that data to be later retrieved from register 506 by accessing the same location in register 506 and reading the data stored therein.

System 500 includes PUF device 508. PUF device 508 is configured to generate an output data (i.e., a "response" value) in response to an input (i.e., a "challenge" value). PUF device 508 includes an array of PUF elements. As such, the challenge issued to the PUF may identify a number of different addresses that identify different PUF elements within PUF device 508 that are to be tested to generate the PUF device 508's response. A challenge generation module 505 is configured to received data from memory interface 504 (as described below) to generate challenge values that are transmitted to PUF device 508.

PUF device 508 is configured to interact with register 507 to store data into register 507 as described herein. Data stored by register 507 is stored at a particular address within register 507 enabling that data to be later retrieved from register 507 by accessing the same location in register 507 and reading the data stored therein.

Figure 5B:
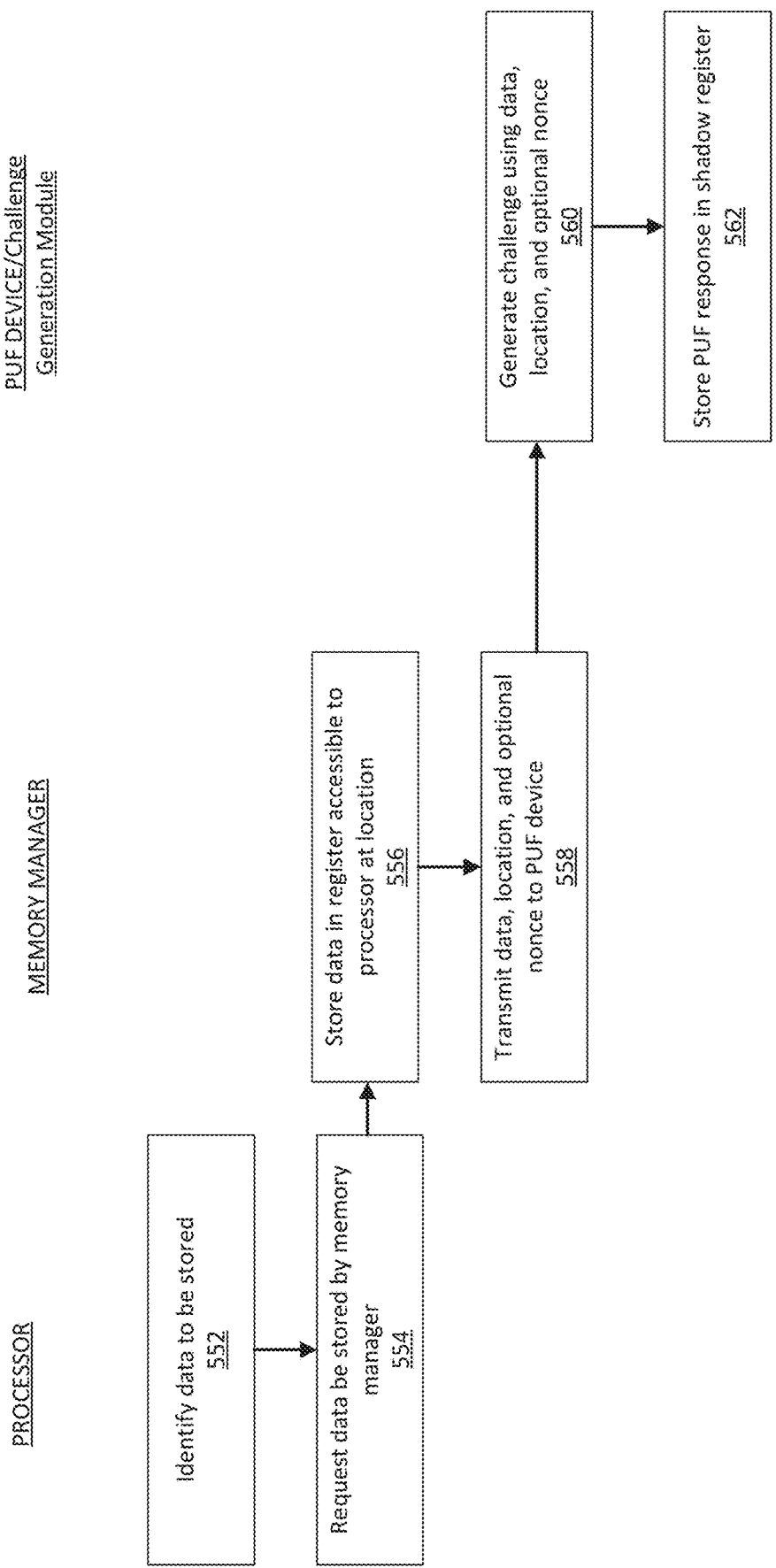
FIG. 5B is a flowchart depicting an example method for storing data using the present data integrity scheme and the system depicted in FIG. 5A.

FIG. 5B is a flowchart depicting an example method for storing data using the present data integrity scheme and the system depicted in FIG. 5A. In step 552, processor 502 identifies (or generates) data to be stored by system 500. In step 554, the processor 502 requests that memory interface 504 store the data.

In step 556, memory interface 504 stores the data in a known location of register 506. After the data has been stored at a particular location in register 506, memory interface 504, in step 558, transmits a copy of the data, the location, and, optionally, a nonce value to PUF device 508 (and, specifically, challenge generation module 505 of PUF device 508). The nonce value may be a randomized value that is generated at power turn on of system 500. A different nonce may be generated at each power-on event and the nonce value may stay static for the period of time the system continues to be powered-up. By changing the nonce at each power on event, even if an attacker is able to access or manipulate the value of the tamper-proof data integrity tag generated by system 500 (and described below), those values may not be used to manipulate data in a different computer system or even in the same system following a power cycle.

In step 560, challenge generation module 505 of PUF device 508 converts the data, location, and nonce values in a challenge that can be used by PUF device 508 to generate a response value. Any suitable algorithm may be utilized to generate the challenge. For example, the data, location, and nonce values may be concatenated into a string. The string may then be used as the challenge. Alternatively, the string can be hashed using a function that generates a fixed-length output based on input data. The fixed-length output of the hashing function can then be translated into an address within the array of PUF elements in the PUF device 508. In some embodiments, challenge generation module 505 of PUF device 508 may be configured to execute additional instructions to use the output of the hashing functions to generate an address or sequence of addresses of PUF elements. For example, the instructions executed by the challenge generation module 505 of PUF device 508 may cause the challenge generation module 505 of PUF device 508 to process the output of the hashing function into a sequence of addresses, where the sequence is determined by the instructions (e.g., starting with an address determined by the output of the hashing function select a number of additional addresses, where the additional addresses are only odd numbered addresses). In some cases, the set of instructions implemented by the challenge generation module 505 of PUF device 508 to determine the set of addresses may be selected based upon the output value of the hashing function. For example, the last digit in the output value may be used to identify a particular algorithm the PUF device uses to generate a set of addresses.

Once generated, the PUF response (which is used herein as a data integrity tag) is stored in register 507 in step 562. In this arrangement, the data integrity tag stored in register 507 can serve as a tamper-proof data integrity tag usable in a data integrity scheme to ensure the integrity of the data that was stored in step 556. To link the stored data integrity tag to the data stored in step 556, an identification of the location at which the data was stored in register 506 at step 556 may be appended to the data integrity tag stored in second register 507 at step 562.

Figure 6A:
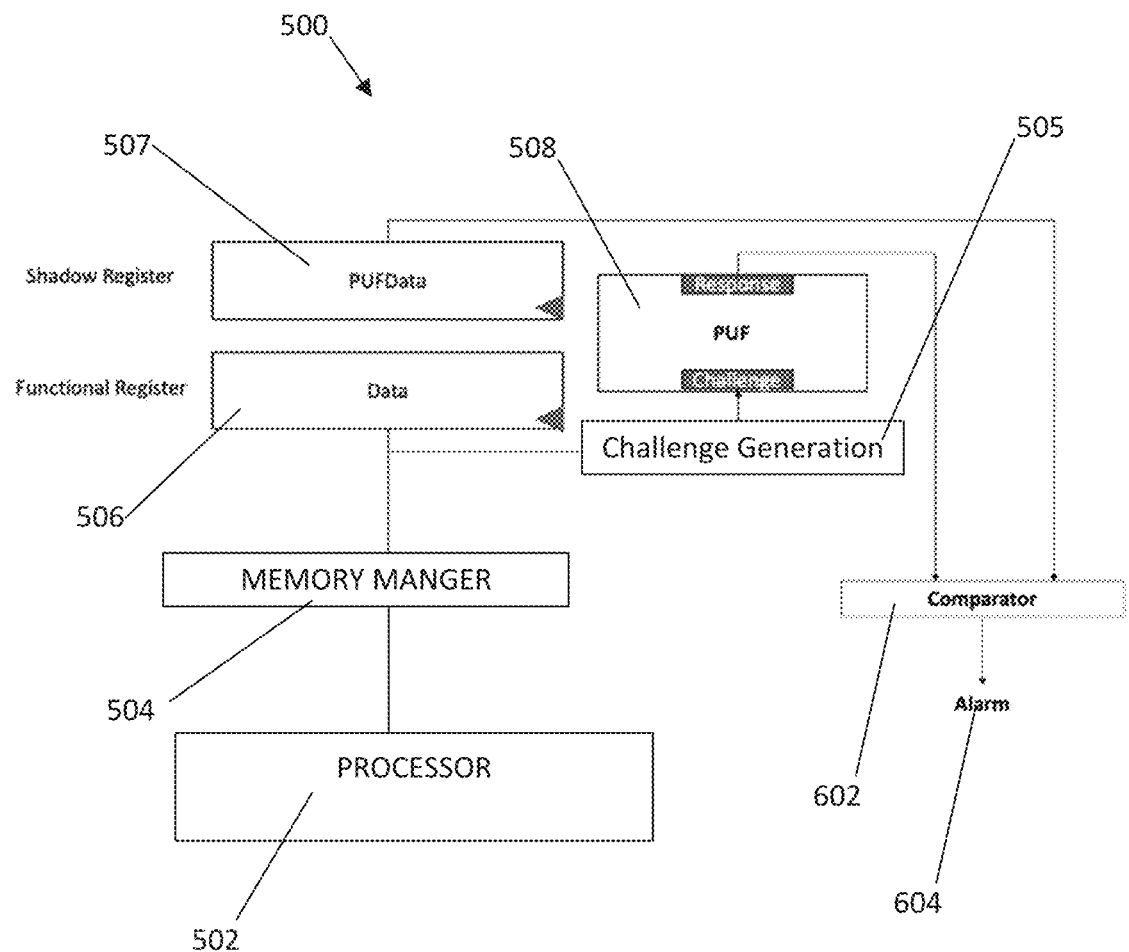
FIG. 6A depicts the system of FIG. 5A arranged to perform a data read function.
Figure 6B:
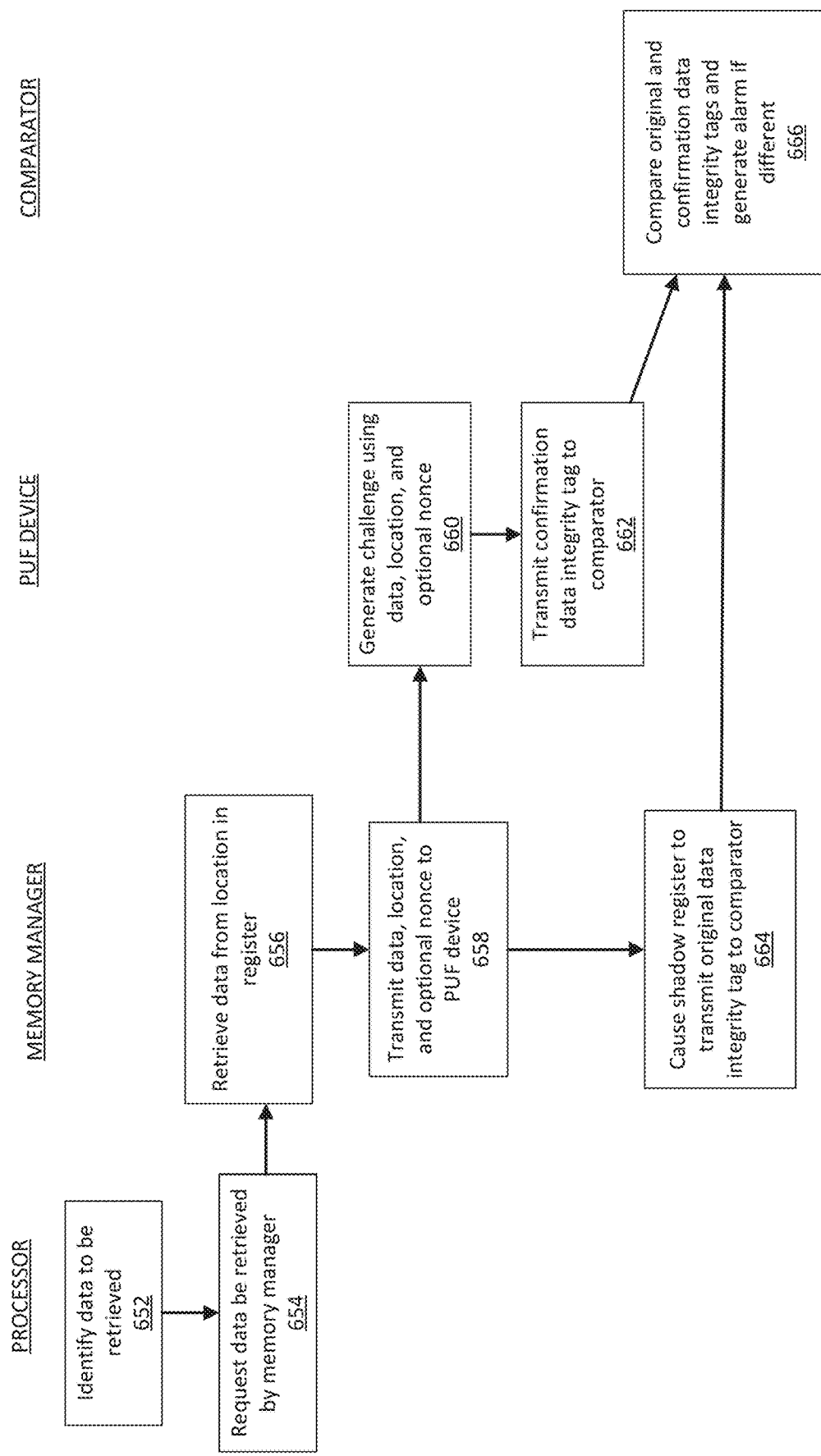
FIG. 6B is a flowchart depicting an example method for retrieving data using the present data integrity scheme and the system depicted in FIG. 6A.

When the data is to be retrieved from register 506, system 500 is configured to implement a data retrieval function. To illustrate, FIG. 6A depicts the system 500 of FIG. 5A arranged to perform a data read function. FIG. 6B is a flowchart depicting an example method for retrieving data using the present data integrity scheme and the system depicted in FIG. 6A.

As illustrated in FIG. 6A, for data reading, system 500 includes a comparator 602 configured to compare data received from PUF device 508 and data from register 507. If the data, as described below, does not match, comparator 602 generates an output alarm 604. The alarm may be used to interrupt the operation of an application running in conjunction with system 500, alert an operator of system 500 (e.g., via an alert displayed on a display screen, or otherwise communicated to the operator), or modifying an operation of system 500 (e.g., by disabling particular network connectivity functions, performing a system reset, or the like).

In step 652, processor 502 identifies data to be retrieved from register 506. In step 654, the processor 502 requests that memory interface 504 retrieve the data from a known location of register 506. Memory interface 504, in step 656 retrieves the data.

After the data has been retrieved from the location in register 506, memory interface 504, in step 658, transmits a copy of the data, the location, and, optionally, a nonce value to PUF device 508 (and, specifically, challenge generation module 505 of PUF device 508). The nonce value may be a randomized value that is generated at power turn on of system 500. A different nonce may be generated at each power-on event and the nonce value may stay static for the period of time the system continues to be powered-up.

In step 660, challenge generation module 505 of PUF device 508 converts the data, location, and nonce values in a challenge that can be used by PUF device 508 to generate a response value. Any suitable algorithm may be utilized to generate the challenge. For example, the data, location, and nonce values may be concatenated into a string. The string may then be used as the challenge. Alternatively, the string can be hashed using a function that generates a fixed-length output based on input data. The fixed-length output of the hashing function can then be translated into an address within the array of PUF elements in the PUF device 508. In some embodiments, challenge generation module 505 of PUF device 508 may be configured to execute additional instructions to use the output of the hashing functions to generate an address or sequence of addresses of PUF elements. For example, the instructions executed by the challenge generation module 505 of PUF device 508 may cause the challenge generation module 505 of PUF device 508 to process the output of the hashing function into a sequence of addresses, where the sequence is determined by the instructions (e.g., starting with an address determined by the output of the hashing function select a number of additional addresses, where the additional addresses are only odd numbered addresses). In some cases, the set of instructions implemented by the challenge generation module 505 of PUF device 508 to determine the set of addresses may be selected based upon the output value of the hashing function. For example, the last digit in the output value may be used to identify a particular algorithm the PUF device uses to generate a set of addresses.

Once generated, the PUF response (which is used herein as a confirmation data integrity tag) is transmitted to comparator 602 in step 662. At or about the same time, in step 664, memory interface 504 causes register 507 to transmit the original data integrity tag to comparator 602. In step 666, comparator 602 compares the original data integrity tag to the confirmation data integrity tag. If the values are the same or equal, the data retrieved from register 506 in step 656 is identical to or equal to the data that was originally stored in register 506 in step 556 of FIG. 5A. If, however, the original data integrity tag is different from the confirmation data integrity tag, comparator 602 outputs an alarm signal providing notification of the discrepancy and indicating that the data retrieved from register 506 may have been altered from when the data was originally stored.

In many applications, multiple computing units (e.g., of a multiprocessor computing system), on the same integrated circuit or on different integrated circuits, may be configured to communicate data amongst one another, using shared memory or other communication mechanisms. In such systems, such multiple computing units may each incorporate a data integrity system, such as system 300 or system 500, that together share a single PUF device. In such an implementation, a first computing unit may use the shared PUF device to compute an original tamper-proof data integrity tag and store the tag in a memory location accessible by a second computing unit. Then, when the second computing unit receives or retrieves the data, the second computing unit can re-compute the tamper-proof data integrity tag using the shared PUF device to generate a confirmation data integrity tag. The second computing unit can then compare the confirmation data integrity tag with the original tamper-proof data integrity tag stored by the first computing unit to determine whether the retrieved data has been modified since it was originally stored by the first computing unit. This mechanism is applicable to symmetric multiprocessing systems where the computing units are peers, or asymmetric multiprocessing systems where one unit holds the role of supervisor. In one application, the first computing unit may be a worker that either senses physical information or performs a computation, and then must send the resulting information to the second computing unit.

The present data integrity scheme, with the data storage, retrieval, and validation processes described above enables a computing unit to detect that data has been corrupted or otherwise modified after being initially stored in memory. In some applications, detection is sufficient, and the data corruption can be mitigated by executing a power-off/power-on cycle to re-start the software. However, in some cases, it may be desirable, upon detecting that data has been corrupted or modified, to recover the original data. In these cases, the systems describe above for implementing the tamper-proof data integrity tags can be augmented with additional trust computing units (e.g., remote computing servers) that are physically distanced from the system generating the data integrity tags. The remote computing servers may serve as a back-up storage solution duplicating data for which data integrity tags have been generated. In this manner, after detection of data corruption by the computing system, the correct data can be retrieved from the remote computing server. This mechanism can further be protected by including the multiple computing unit process described above, where a third secure server can provide a PUF device accessible by both the computing unit and the remote computing server.

Figure 7:
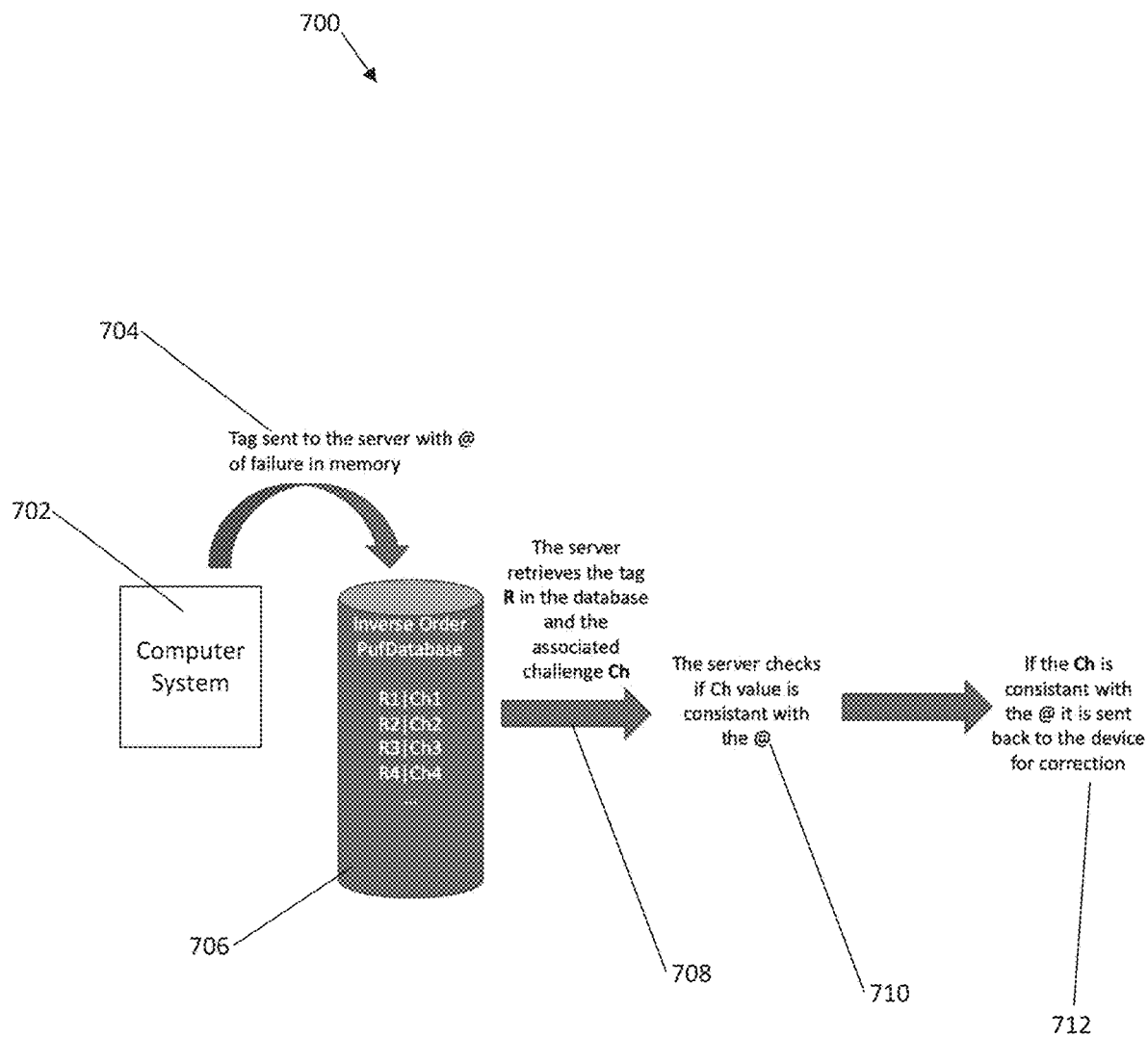
FIG. 7 depicts an example data flow for implementing data recovery using the present data integrity protection scheme.

FIG. 7 depicts an example data flow for implementing data recovery using the present data integrity protection scheme. An example of data recovery can be illustrated by the following mechanisms. Upon error detection, the computer system 702 device sends (at step 704) the address where the data that has become corrupted or modified was stored is transmitted to a remote computer system such as remote computing server 706. Additionally, the data integrity tag associated with the data is also transmitted to the remote computing server 706. Remote computer server 706 includes a database storing a plurality of data integrity tags as well as the challenges that were used to generate the data integrity tags that have been previously transmitted by computer system 702 when originally storing data. The data integrity tags and the challenges that generated the data integrity tags may be transmitted by computer 702 to remote computing server 706 during normal operations of computer system 702.

Upon receipt of the address and data integrity tag from computer system 702 in step 704, remote computing server 706 search for the copy of the data integrity tag stored by remote computing server 706 and retrieves the stored challenge value corresponding to that stored data integrity tag. The challenges are made of both the address and the original data. Accordingly, in step 710, the remote computing server 706 checks that the address in the challenge corresponds to the one sent by computer system 702 in step 704. If yes, then it means that the tag was not altered, and the original data can be extracted from the portion of the challenge that contained the original data. In step 712, the challenge is sent back to the computer system 702 which can recover the original data out of the challenge. If the address does not match with the part of the challenge, however, this may indicate that the tag has been altered and no data can be retrieved.

Using these data integrity schemes, if an attacker modifies both the stored DATA becoming DATA' and the stored data integrity tag TAG, becoming TAG': The only condition that could makes the modification undetectable is that the TAG' in memory exactly corresponds to the TAG generated by DATA', the address and the nonce. This probability can be relatively low due to PUF avalanche effect properties.

In a potential circumstance, a memory leak may allow an attacker to know a valid PUF challenge/response pair and attempt to use that information to corrupt data stored in a computer system's memory. In that case, the data modification may not be detected because the confirmation data integrity tag generated by the PUF device may be identical or equal to the modified TAG. However, in that case, the attacker won't be able to reproduce the same attack to another computer system since the PUF device in a different computer system will different output TAGs, even when presented with the same challenges. Additionally, because the address is used to generate the challenge, the leak can work only at the given address within the computer system memory. Furthermore, the incorporation of a nonce value into the challenge, where the nonce value is generated after each power-on, makes the attack possible only for the given execution or computer system power cycle. The attack will fail after a new power-off/power-on sequence.

Implementations of the present data integrity scheme may call the generation of relatively large data integrity tags (e.g., ranging from 16 to 128 bits) which will result in an extra overhead that may not be acceptable in some applications. Accordingly, the data integrity tags may be compressed using traditional methods of data compression or, alternatively, the data integrity tags can be made by sampling bits of the response generated by the PUF device. Such data compression techniques can be used to reduce the data integrity tag length without breaking PUF device to PUF device uniqueness.

In some embodiments of the present system, a single data integrity tag can be used to assure the integrity of several data items. In creating such a data integrity tag, the data to be stored in several registers or memory locations can be combined to generate a single PUF challenge. The data integrity tag generated in response to that challenge is then linked to multiple data items.

While this description describes aspects and embodiments by illustration to some examples, those skilled in the art will understand that additional implementations and use cases may come about in many different arrangements and scenarios. Innovations described herein may be implemented across many differing computer system platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). Implementations may be chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. It is intended that innovations described herein may be practiced in a wide variety of devices, chip-level components, systems, distributed arrangements, end-user devices, etc. of varying sizes, shapes and constitution.

In this application, memory devices and memory systems may refer to storage media and computer readable media for containing data, code, or portions of code, that can include any appropriate storage media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, read-write optical storage, magnetic cassettes, magnetic tape, magnetic disk storage or other magnetic storage devices or any other medium which can be used to store the desired information and which can be accessed by the system. Based on the disclosure and teachings provided herein, a person of ordinary skill in the art will appreciate other ways and/or methods to implement the various embodiments.

The described features, advantages, and characteristics may be combined in any suitable manner in one or more embodiments. One skilled in the relevant art will recognize that the various embodiments may be practiced without one or more of the specific features or advantages of a particular embodiment. In other instances, additional features and advantages may be recognized in certain embodiments that may not be present in all embodiments.

It should be understood that, unless explicitly stated or otherwise required, the features disclosed in embodiments explicitly described herein and elsewhere in this disclosure may be used in any suitable combinations and using various suitable parameters. Thus, as a non-limiting example, any method described herein or any other suitable method may be used to determine measurement parameters of for measuring the characteristics of PUF device. As a non-limiting example, the message length, the size of message fragments, address lengths, the size of PUF arrays used and other parameters may be varied as desired for different applications. It should also be understand that while memristor-based PUF devices are discussed in the examples herein, they are intended as non-limiting examples of suitable PUF technologies. It should also be understood that although examples herein disclose hashing responses or private keys 256 times, that nothing herein is intended to require the use of 256 hashing cycles to generate the keys used for the hash-based encryption/decryption processes disclosed herein and that other suitable values may be chosen. It should also be understood that descriptions of repeated hashing with a hash are intended for purposes of illustration only and that any suitable one-way cryptographic function, as described above, may be used.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

The invention claimed is:

1. A system, comprising:
a memory device configured to store data at addressable locations in the memory device;
a physically unclonable function (PUF) device including an array of addressable PUF elements; and
a memory interface coupled to the memory device and the PUF device, wherein the memory interface is configured to:
receive a request to store first data in the memory device,
store the first data in the memory device at a first location of the memory device, and
transmit the first data and the first location to the PUF device, wherein the PUF device is configured to:
create a first challenge value using the first data and the first location, wherein, the first challenge value indicates an address in the array of addressable PUF elements,
generate a first response value using the first challenge value, the first response value reflecting a response of a PUF element having the address in the addressable array of PUF elements, and store the first response value as a first data integrity tag in a second location of the memory device, wherein the first data integrity tag is associated with the first data.

2. The system of claim 1, further comprising a comparator and wherein the memory interface is configured to:
receive a request to retrieve the first data from the memory device;
access the memory device at the first location to retrieve the first data as retrieved first data;
retrieve the first data integrity tag from the second location of memory device; and
transmit the retrieved first data and the first location to the PUF device, wherein the PUF device is configured to:
create a second challenge value using the retrieved first data and the first location, and
generate a second response value using the challenge value, wherein the second response value is a second data integrity tag, and wherein the comparator is configured to output an alarm signal when the first data integrity tag is not equal to the second data integrity tag.

3. The system of claim 2, wherein the memory interface is further configured to transmit the first challenge value and the first location to a remote computer system for storage.

4. The system of claim 3, wherein the memory interface is further configured to, upon receipt of the alarm signal:
transmit the first location and the first data integrity tag to the remote computer system; and
receive, in response to the first location and the first data integrity tag, a third data from the remote computer system.

5. The system of claim 2, wherein the memory interface is further configured to transmit a nonce value to the PUF device, and the PUF device is configured to create the first challenge value using the nonce value and the second challenge using the nonce value.

6. The system of claim 5, wherein the nonce value is modified in response to the system being powered on, and remains static while the system is powered on.

7. The system of claim 5, wherein the PUF device is configured to:
create the first challenge by concatenating the first data, the first location, and the nonce value; and
create the second challenge by concatenating the retrieved first data, the first location, and the nonce value.

8. The system of claim 1, wherein the request to store first data is received from a first computing unit of a multiprocessor computing system and the request to retrieve the first data is received from a second computing unit of the multiprocessor computing system.

9. The system of claim 1, wherein the memory interface does not have access to the second location of the memory device.

10. A system, comprising:
a first register configured to store data at addressable locations in the first register;
a second register configured to store data at addressable locations in the second register;
a physically unclonable function (PUF) device including an array of PUF elements, wherein the PUF device is configured to store data in the second register and retrieve data from the second register, and the PUF device cannot access the first register; and
a memory interface coupled to the first register and the PUF device, wherein the memory interface is configured to store data in the first register and retrieve data from the first register, and the memory interface cannot access the second register and the memory interface is configured to:
store first data in the first register at a first location of the first register, and
transmit the first data and the first location to the PUF device, wherein the PUF device is configured to:
create a first challenge value using the first data and the first location,
generate a first response value using the first challenge value, and
store the first response value as a first data integrity tag in the second register, wherein the first data integrity tag is associated with the first data.

11. The system of claim 10, further comprising a comparator and wherein the memory interface is configured to:
access the first register at the first location to retrieve the first data as retrieved first data; and
transmit the retrieved first data and the first location to the PUF device, wherein the PUF device is configured to:
create a second challenge value using the retrieved first data and the first location, and
generate a second response value using the challenge value, wherein the second response value is a second data integrity tag, and wherein the comparator is configured to output an alarm signal when the first data integrity tag is not equal to the second data integrity tag.

12. The system of claim 11, wherein the memory interface is further configured to transmit the first challenge value and the first location to a remote computer system for storage.

13. The system of claim 12, wherein the memory interface is further configured to, upon receipt of the alarm signal:
transmit the first location and the first data integrity tag to the remote computer system; and
receive, in response to the first location and the first data integrity tag, a third data from the remote computer system.

14. The system of claim 11, wherein the memory interface is further configured to transmit a nonce value to the PUF device, and the PUF device is configured to create the first challenge value using the nonce value and the second challenge using the nonce value.

15. The system of claim 10, wherein the first register, the second register, and the memory interface are implemented in an on-chip solution.

16. A method, comprising:
receiving a request to store first data in a memory device, wherein the memory device is configured to store data at addressable locations in the memory device;
storing the first data in the memory device at a first location of the memory device;
creating a first challenge value using the first data and the first location, wherein the first challenge value indicates an address in an addressable array of PUF elements;
transmitting the first challenge value to a PUF device to generate a first response value using the first challenge value, the first response value reflecting a response of a PUF element having the address in the addressable array of PUF elements; and
storing the first response value as a first data integrity tag in the memory device, wherein the first data integrity tag is associated with the first data.

17. The method of claim 16, further comprising:
receiving a request to retrieve the first data from the memory device;

accessing the memory device at the first location to retrieve the first data as retrieved first data;

retrieving the first data integrity tag from the memory device;

creating a second challenge value using the retrieved first data and the first location;

transmitting the second challenge to a PUF device to generate a second response value using the challenge value, wherein the second response value is a second data integrity tag; and outputting an alarm signal when the first data integrity tag is not equal to the second data integrity tag.

18. The method of claim 17, further comprising transmitting the first challenge value and the first location to a remote computer system for storage.

19. The method of claim 18, further comprising, upon receipt of the alarm signal:

transmitting the first location and the first data integrity tag to the remote computer system; and receiving, in response to the first location and the first data integrity tag, a third data from the remote computer system.

20. The method of claim 17, further comprising:

determining a nonce value;

creating the first challenge value using the nonce value; and creating the second challenge value using the nonce value.

* * * * *